(12) United States Patent
Hotta

(10) Patent No.: US 7,004,864 B2
(45) Date of Patent: Feb. 28, 2006

(54) AUXILIARY-DRIVING SYSTEM IN ENGINE

(75) Inventor: Naoki Hotta, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 36 days.

(21) Appl. No.: 10/170,398

(22) Filed: Jun. 14, 2002

(65) Prior Publication Data

US 2003/0004023 A1 Jan. 2, 2003

(30) Foreign Application Priority Data

Jun. 20, 2001 (JP) .............................. 2001-186114

(51) Int. Cl.
*F16H 7/08* (2006.01)
*F16H 7/18* (2006.01)

(52) U.S. Cl. ..................... 474/135; 474/87; 474/117; 474/133

(58) Field of Classification Search ................ 474/136, 474/144, 135, 117, 133, 69, 70, 170, 112, 474/139, 87, 101; 123/41.4, 90.15, 90.27, 123/90.31
See application file for complete search history.

(56) References Cited

U.S. PATENT DOCUMENTS

| | | | |
|---|---|---|---|
| 4,031,761 A | * | 6/1977 | Fisher et al. .................. 474/87 |
| 4,459,123 A | * | 7/1984 | Tatsunaka et al. ............. 474/87 |
| 4,530,683 A | * | 7/1985 | Kasugai et al. ............. 474/144 |
| 4,536,172 A | * | 8/1985 | Burris et al. ................. 474/135 |
| 4,576,127 A | * | 3/1986 | Doi et al. ................. 123/90.15 |
| 4,689,037 A | * | 8/1987 | Bytzek ........................ 474/135 |
| 4,822,321 A | * | 4/1989 | Webb ......................... 474/117 |
| 4,824,421 A | * | 4/1989 | Komorowski ............... 474/135 |
| 5,139,463 A | * | 8/1992 | Bytzek et al. ................. 474/69 |
| 5,277,666 A | * | 1/1994 | Kumm ....................... 474/133 |
| 5,580,325 A | * | 12/1996 | Hirota et al. ............... 474/144 |

FOREIGN PATENT DOCUMENTS

| JP | 04-337154 A | * | 11/1992 | .................. 474/144 |
|---|---|---|---|---|
| JP | 2001-311456 A | * | 11/2001 | |

* cited by examiner

*Primary Examiner*—Marcus Charles
(74) *Attorney, Agent, or Firm*—Armstrong, Kratz, Quintos, Hanson & Brooks, LLP

(57) ABSTRACT

In an auxiliary-driving system in an engine, a crank pulley, a first auxiliary pulley and an idler pulley having a tensioner function are disposed in a triangular configuration with the idler pulley located in an uppermost position; and a second auxiliary pulley is disposed in a space surrounded by these pulleys. An endless transmitting belt is reeved around the pulleys. An inner surface of the transmitting belt is reeved around the first auxiliary pulley; and an outer surface of the transmitting belt is reeved around the second auxiliary pulley. Thus, the adjustment of the tension of the transmitting belt and other maintenance are facilitated, the transmitting efficiency of the transmitting belt can be enhanced, and compactness of the auxiliary-driving system itself and improvement in mileage can be achieved.

9 Claims, 3 Drawing Sheets

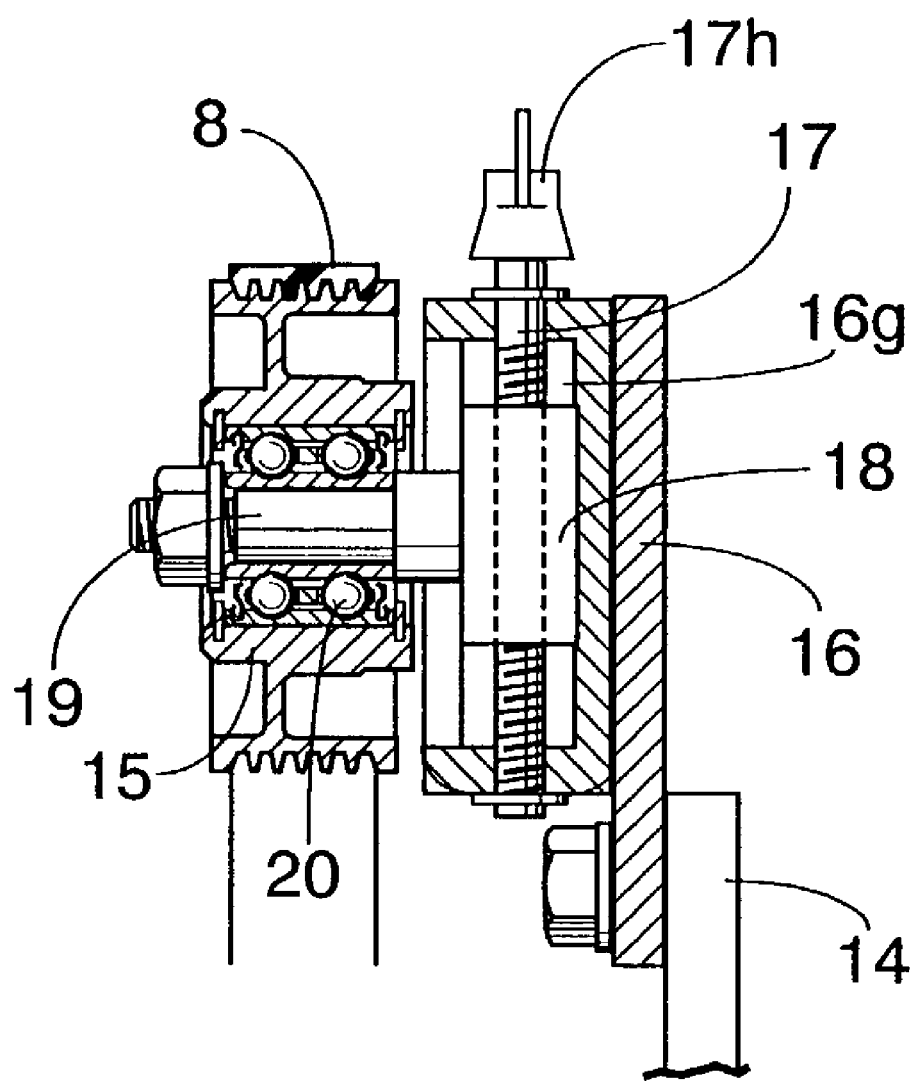

AUXILIARY-DRIVING SYSTEM IN ENGINE

BACKGROUND OF THE INVENTION

1. Field of the Invention

The present invention generally relates to an auxiliary-driving system in an engine, which is adapted to drive auxiliaries supported on an engine body by a crankshaft of the engine body through a driving mechanism comprising pulleys and a transmitting belt.

2. Discussion of the Related Art

There is a conventionally known auxiliary-driving system in an engine for driving an automobile or the like, in which an endless belt is reeved, on one side of an engine body in a direction perpendicular to a crankshaft, around a crank pulley fixed to a crankshaft, a plurality of auxiliary pulleys for driving auxiliaries supported on the engine body and a tensioner, as shown in FIG. 3A and in FIG. 3B.

However, the conventionally known system suffers from a problem that the tensioner is disposed at a vertically intermediate portion of the endless transmitting belt, and further, at a location closer to the engine body. Hence, it is difficult to conduct the adjustment of the tensioner and to perform other necessary maintenance.

The conventionally known system also suffers from another problem in that it is difficult to ensure a large reeving angle of the transmitting belt with respect to the auxiliary pulleys; and hence, a transmitting belt having a large width and a large tension is required, thereby resulting in an increase in size of the auxiliary-driving system and a deterioration of mileage.

SUMMARY OF THE INVENTION

It is therefore an object of the present invention to provide a new auxiliary-driving system in an engine, wherein an idler pulley having a tensioner function is located on an uppermost portion of a transmitting belt, thereby facilitating the adjustment of the tension of the transmitting belt and other maintenance; and both reeving angle of an inner surface of the belt with respect to an auxiliary pulley and reeving angle of an outer surface of the belt with respect to an auxiliary pulley can be ensured as large as possible, thereby enhancing the transmitting efficiency of the transmitting belt; and compactness of the auxiliary-driving system itself and reduction in cost thereof can be achieved.

To achieve the above object, according to a first feature of the present invention, there is provided an auxiliary-driving system in an engine, adapted to drive auxiliaries supported on an engine body by a crankshaft of the engine body, comprising: a crank pulley, a first auxiliary pulley and an idler pulley having a tensioner function, which are disposed in a triangular configuration with the idler pulley located in an uppermost position, on one side of the engine body in a direction perpendicular to the crankshaft; a second auxiliary pulley disposed in a space surrounded by these pulleys, and an endless transmitting belt reeved around the crank pulley, the idler pulley, the first auxiliary pulley and the second auxiliary pulley; an inner surface of the transmitting belt being reeved around the first auxiliary pulley, and an outer surface of the transmitting belt being reeved around the second auxiliary pulley. With this arrangement, both the reeving angles of the inner surface and outer surface of the transmitting belt with respect to the first and second auxiliary pulleys can be determined to be large, whereby the width and tension of the transmitting belt can be decreased to achieve compactness of the auxiliary-driving system and improvement in mileage. In addition, the adjustment of the tension of the transmitting belt and other maintenance can be carried out easily, because the idler pulley having the tensioner function is located at the uppermost portion of the auxiliary-driving system.

To achieve the above object, according to a second feature of the present invention, in addition to the arrangement of the first feature, the second auxiliary driven by the second auxiliary pulley has an absorbing horsepower smaller than that of the first auxiliary driven by the first auxiliary pulley. With this structural arrangement, in addition to an effect of the first feature of the present invention, the first and second auxiliary pulleys can be driven efficiently in correspondence to the magnitudes of the absorbing horsepowers of the auxiliaries.

Further, to achieve the above object, according to a third feature of the present invention, in addition to the arrangement of the first or second feature, the engine body is provided with a projection for preventing the mis-reeving of the endless transmitting belt. With this structural arrangement, in addition to the effect of the first or second feature of the present invention, the mis-assembling of the transmitting belt can be prevented, leading to an enhancement in efficiency of assembling thereof.

BRIEF DESCRIPTION OF THE DRAWINGS

FIG. 2 is an enlarged sectional view taken along a line 2—2 in FIG. 1.

DETAILED DESCRIPTION OF THE PREFERRED EMBODIMENT

The mode for carrying out the present invention will now be described by way of an embodiment of the present invention shown in the accompanying drawings.

The present embodiment shows a case where an auxiliary-driving system of the present invention is utilized in an engine for an automobile.

Figure 1:
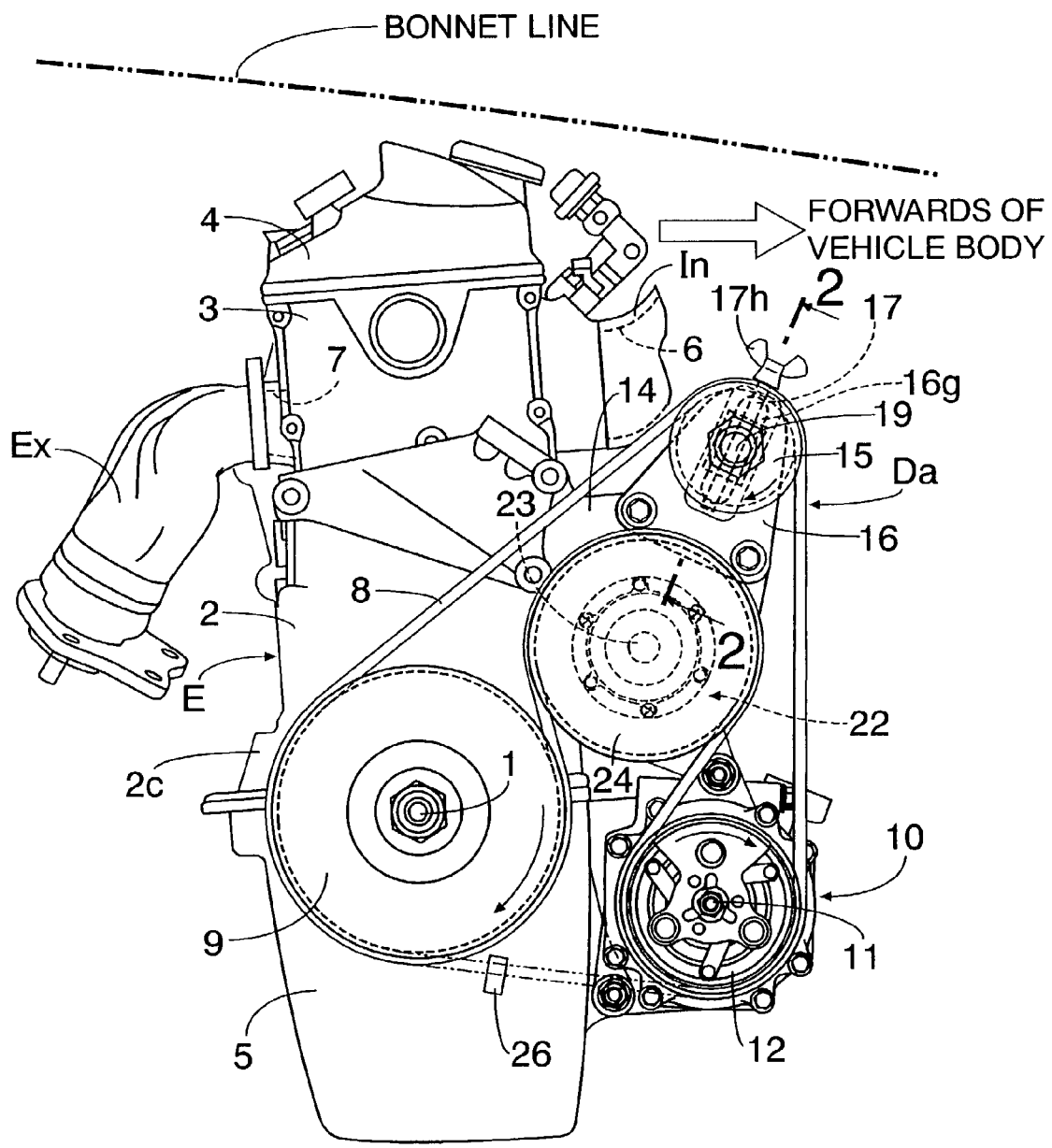
FIG. 1 is a side view of an in-line multi-cylinder 4-cycle engine including an auxiliary-driving system according to the present invention.
Figure 3A:
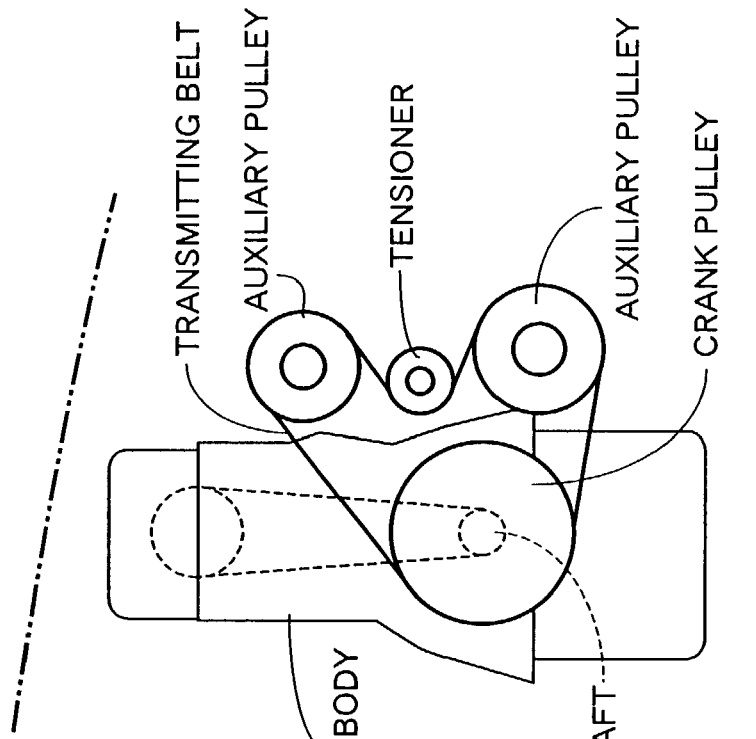
FIG. 3 shows schematic side views of conventional auxiliary-driving systems in an engine.
Figure 3B:
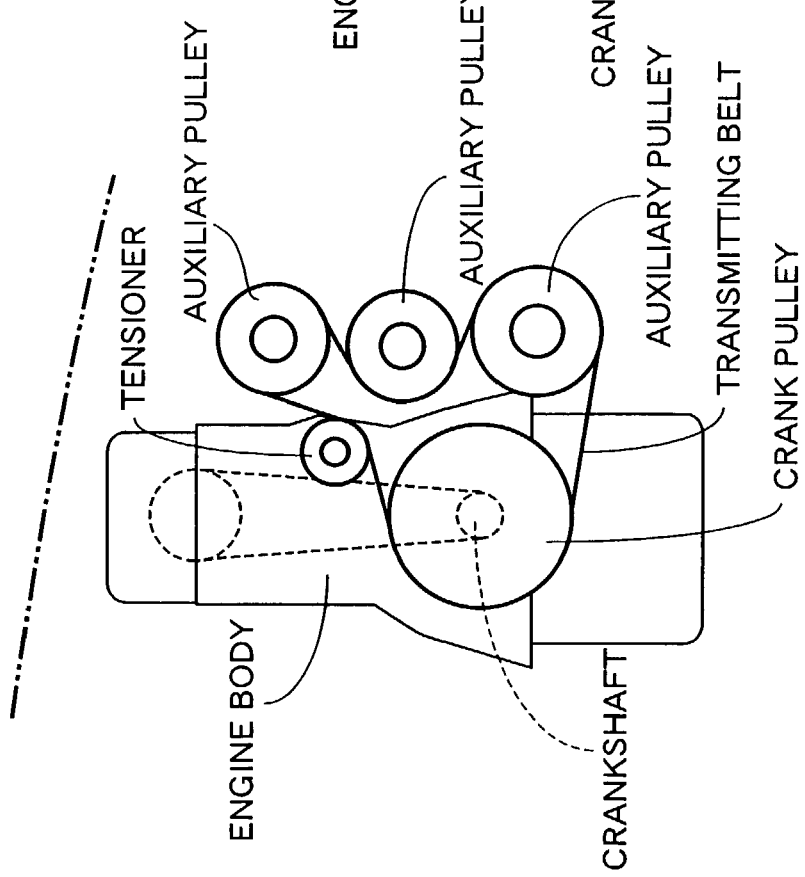

Referring to FIG. 1, an engine body E of an in-line multi-cylinder 4-cycle engine is disposed laterally at a front portion of a vehicle body of an automobile, i.e., a crankshaft 1 thereof is disposed in a direction perpendicular to a longitudinal direction of the vehicle body. The engine body E includes a cylinder block 2 in which a plurality of cylinders are arranged in line, a cylinder head 3 coupled onto the cylinder block 2, a head cover 4 covering an upper surface of the cylinder head 3, and an oil pan 5 coupled to a lower surface of a crankcase portion 2c of the cylinder block 2. A crankshaft 1 is rotatably carried in the crankcase portion 2c. An intake port 6 connected to an intake system In is opened in a front surface of the engine body E extending in a direction of the crankshaft (a right surface in FIG. 1); and an exhaust port 7 connected to an exhaust system Ex is opened in a rear surface extending in the direction of the crankshaft (a left surface in FIG. 1).

Referring to FIG. 1, an auxiliary-driving system Da in the engine according to the present invention is mounted on one of the sides of the engine body E perpendicular to the crankshaft 1 (a side perpendicular to a surface of a paper sheet of FIG. 1).

The structural arrangement of the auxiliary-driving system Da will hereinafter be described below in detail.

A crank pulley 9 is fixed to an outer end of the crankshaft 1, and a plurality of recesses and projections are formed circumferentially on an outer peripheral surface of the crank pulley 9, as usual.

A compressor, which is a first auxiliary 10 (i.e., a compressor) is integrally supported at a lower portion of a front side of the engine body E, and a compressor pulley (i.e., a first auxiliary pulley 12) is fixed to an end of a drive shaft 11 of the compressor 10. The auxiliary pulley 12 is located on the same plane as the crank pulley 9, a plurality of recesses and projections are also formed circumferentially on an outer peripheral surface of the auxiliary pulley 12, as usual.

An idler pulley 15 having a tensioner function is supported in front of an upper portion of the engine body E through a bracket 14 so that the position thereof can be adjusted. As clearly shown in FIG. 2, an adjusting frame 16 is fixed to the bracket 14, and a threaded rod 17 having a grip 17*h* at its upper end is rotatably carried on the adjusting frame 16. An adjuster 18 is slidably engaged in a guide groove 16*g* in the adjusting frame 16, and is threadedly fitted over the threaded rod 17. An idler pulley shaft 19 is integrally, projectingly provided on the adjuster 18; and the idler pulley 15 having the tensioner function is rotatably carried on the idler pulley shaft 19 with ball bearings 20 interposed therebetween. When the grip 17 is grabbed to turn the threaded rod 17, the adjuster 18 threadedly engaged on the threaded rod 17 can be advanced and retracted for adjustment along with the idler pulley 15 with respect to the second auxiliary pulley 24, which will be described hereinafter. The idler pulley 15 is located on the same plane as the crank pulley 9 and the first auxiliary pulley 12, and a plurality of recesses and projections are also formed circumferentially on an outer peripheral surface of the idler pulley 15, as usual.

As shown in FIG. 1, the crank pulley 9, the first auxiliary pulley 12 and the idler pulley 15 having the tensioner function are disposed in a triangular configuration with the idler pulley 15 located in an uppermost position, as viewed in the direction of the crankshaft 1. An inner surface of an endless transmitting belt 8 having a plurality of recesses and projections formed thereon in the longitudinal direction is reeved around the outer peripheral surfaces of the pulleys 9, 12 and 15.

A water pump, which is a second auxiliary 22, is integrally supported at a front portion of the cylinder block 2 of the engine body E. A pump pulley (i.e., a second auxiliary pulley 24 having a diameter larger than that of the first auxiliary pulley 12) is fixed to an outer end of a pump shaft 23 of the water pump 22. The second auxiliary pulley 24 is disposed in a space defined by the three parts (i.e., the crank pulley 9, the first auxiliary pulley 12 and the idler pulley 15 having the tensioner function), which are disposed in the triangular configuration; and at a location closer to the crank pulley 9 and the first auxiliary pulley 12. The second auxiliary pulley 24 is located on the same plane as the crank pulley 9, the first auxiliary pulley 12 and the idler pulley 15. A flat inner surface of the transmitting belt 8 is reeved around the crank pulley 9 and the first auxiliary pulley 12. An outer surface of the transmitting belt 8 is reeved around a smooth outer peripheral surface of the second auxiliary pulley 24. The second auxiliary pulley 24 is disposed between the crank pulley 9 and the first auxiliary pulley 12 and also at the location closer to the pulleys 9 and 12, as shown in FIG. 1. Consequently, a large reeving angle of the inner surface of the transmitting belt 8 with respect to the first auxiliary pulley 12 can be ensured; and a large reeving angle of the outer surface of the transmitting belt 8 with respect to the second auxiliary pulley 24 can be ensured. Even if the flat outer surface of the transmitting belt 8 is reeved around the second auxiliary pulley 24, a large friction transmitting force by the transmitting belt 8 can be ensured by increasing the reeving angle of the flat outer surface of the transmitting belt 8.

Even if the second auxiliary pulley 24 of the second auxiliary, i.e., the water pump 22 (having an absorbing horsepower smaller than that of the first auxiliary 10), is driven by the outer surface of the transmitting belt 8 having no recess and no projection, a desired friction transmitting force can be ensured by increasing the reeving angle of the transmitting belt 8. Thus, it is possible to decrease the width and tension of the transmitting belt.

As indicated by a two-dot dashed line in FIG. 1, a bonnet line of the automobile is shown above the engine body E. Since the idler pulley 15 having the tensioner function is located at the uppermost portion of the auxiliary-driving system Da and just below the bonnet line, the adjustment and maintenance of the idler pulley 15 can be carried out promptly and easily by opening a bonnet.

As shown in FIG. 1, a projection 26 as an obstacle for a failsafe is integrally provided in an outward facing manner between the crank pulley 9 and the second auxiliary pulley 24 and on a side of the oil pan 5 in the engine body E between lowermost portions of the crank pulley 9 and the second auxiliary pulley 24. Thus, the transmitting belt 8 can be prevented from being accidentally reeved, without via the second auxiliary pulley 24, around the other pulleys, as shown by a two-dot dashed line in FIG. 1.

The rotation of the crank pulley 9 fixed to the crankshaft 1 by driving of the engine E drives both the first and second auxiliary pulleys 12 and 24 through the endless transmitting belt 8. In this case, the first auxiliary pulley 12 for driving the first auxiliary 10 (the compressor) having the relatively large absorbing horsepower is driven by the inner surface of the transmitting belt 8; and the second auxiliary pulley 24 for driving the second auxiliary 22 (the water pump) having the absorbing horsepower smaller than that of the first auxiliary 12 is driven by the outer surface of the transmitting belt 8. In addition, the width and tension of the transmitting belt 8 can be decreased, thereby, providing compactness of the auxiliary-driving system Da and improvement in mileage because both the reeving angles of the transmitting belt 8 with respect to the first and second auxiliary pulleys 12 and 24 can be increased, as described above.

The adjustment of the tension of the transmitting belt 8 is conducted by controlling the advancement and retraction of the idler pulley 15 in turning the threaded rod 17 by the grip 17*h*. Since the idler pulley 15 is located at the uppermost portion of the auxiliary-driving system Da, the adjustment of the tension of the auxiliary-driving system Ds and other maintenance can be carried out promptly and easily.

Although the embodiment of the present invention has been described, it will be understood that the present invention is not limited to the embodiment, and various modifications may be made within the scope of the present invention.

For example, the auxiliary-driving system according to the present invention has been described as being utilized in the engine for the automobile in the above-described embodiment, but may of course be utilized in an engine for another application. Means for increasing the friction transmitting force, such as some recesses and projections to provide unevenness, may be provided on the outer surface of the transmitting belt.

As discussed above, according to the present invention, in the auxiliary-driving system having the pulleys and the transmitting belt, both the reeving angles of the inner surface and outer surface of the transmitting belt with respect to the first and second auxiliary pulleys can be determined to be large. Thus, it is possible to decrease the width and tension of the transmitting belt and to achieve compactness of the auxiliary-driving system and improvement in mileage. It is also possible to easily carry out the adjustment of the tension of the transmitting belt and other maintenance.

In addition, according to the present invention, the first and second auxiliary pulleys can be driven efficiently in correspondence to the magnitudes of the absorbing horsepowers of the auxiliaries.

Further, according to the present invention, the misassembling of the transmitting belt can be prevented, leading to an enhancement in efficiency of assembling thereof.

What is claimed is:

1. An auxiliary-driving system in an engine for driving auxiliaries supported on an engine body by a crankshaft of the engine body, the system comprising:
  a crank pulley, a first auxiliary pulley and an idler pulley having a tensioner function, which are disposed in a triangular configuration with said idler pulley located in an uppermost position higher than said crank pulley and said first auxiliary pulley, on one side of the engine body in a direction perpendicular to the crankshaft;
  a second auxiliary pulley disposed in a triangular space surrounded by said pulleys;
  an endless transmitting belt reeved around said crank pulley, said idler pulley, said first auxiliary pulley and said second auxiliary pulley, an inner surface of said transmitting belt being reeved around said first auxiliary pulley and said idler pulley, and an outer surface of said transmitting belt being reeved around said second auxiliary pulley, said projection preventing a mis-reeving of said belt; and
  a projection disposed on the engine body between said crank pulley and first auxiliary pulley.

2. An auxiliary-driving system in an engine according to claim 1, wherein a second one of said auxiliaries driven by said second auxiliary pulley has an absorbing horsepower smaller than that of a first one of said auxiliaries driven by said first auxiliary pulley.

3. An auxiliary-driving system in an engine according to claim 1 or 2, wherein said projection blocks a path of said transmitting belt when said transmitting belt is mis-reeved.

4. An auxiliary-driving system in an engine according to claim 2, wherein said second auxiliary pulley is located at a position upstream of said first auxiliary pulley in a direction of transmission of a driving force from said crank pulley.

5. An auxiliary-driving system in an engine for driving auxiliaries supported on an engine body by a crankshaft of the engine body, the system comprising:
  a crank pulley, a first auxiliary pulley and an idler pulley having a tensioner function, which are disposed in a triangular configuration with said idler pulley located in an uppermost position, on one side of the engine body in a direction perpendicular to the crankshaft;
  a second auxiliary pulley disposed in a space surrounded by said pulleys;
  an endless transmitting belt reeved around said crank pulley, said idler pulley, said first auxiliary pulley and said second auxiliary pulley, an inner surface of said transmitting belt being reeved around said first auxiliary pulley, and an outer surface of said transmitting belt being reeved around said second auxiliary pulley; and
  a projection disposed on the engine body between said crank pulley and said first auxiliary pulley, said projection being located in a position blocking a path of said transmitting belt when said transmitting belt is mis-reeved, wherein
  the inner surface of said transmitting belt is reeved around said crank pulley and said idler pulley.

6. An auxiliary-driving system in an engine, the system comprising:
  a crank pulley, a first auxiliary pulley and an idler pulley having a tensioner function, which are disposed on a body of the engine in a triangular configuration;
  a second auxiliary pulley disposed in a space surrounded by said crank pulley, said first auxiliary pulley and said idler pulley;
  a belt reeved around said crank pulley, said idler pulley, said first auxiliary pulley and said second auxiliary pulley, an inner surface of said belt being reeved around said crank pulley, said first auxiliary pulley and said idler pulley, and an outer surface of said belt being reeved around said second auxiliary pulley; and
  a projection disposed on the body between said crank pulley and said first auxiliary pulley, said projection preventing a mis-reeving of said belt.

7. The auxiliary-driving system of claim 6, said second auxiliary pulley driving a second auxiliary having an absorbing horsepower smaller than that of a first auxiliary driven by said first auxiliary pulley.

8. The auxiliary-driving system of claim 6, wherein the engine is located in a vehicle having a bonnet, there being a smaller distance between the bonnet and said idler pulley than between the bonnet and any one pulley selected from among said crank pulley, said first auxiliary pulley and said second auxiliary pulley.

9. The auxiliary-driving system of claim 6, wherein the triangular configuration is in a direction perpendicular to a crankshaft.

* * * * *